Feb. 18, 1936.    S. E. CAMPBELL    2,031,407
FASTENER
Filed June 13, 1935
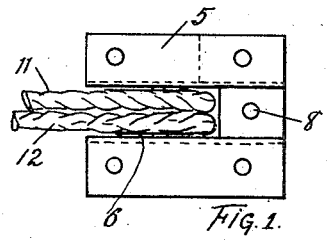
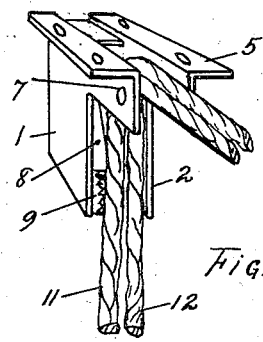
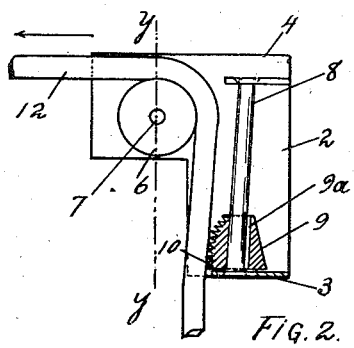
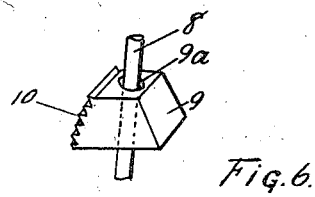
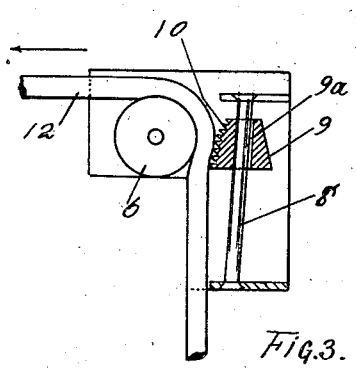
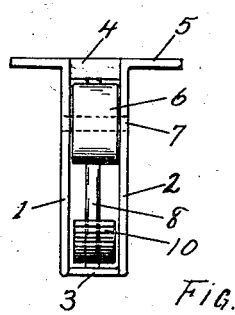
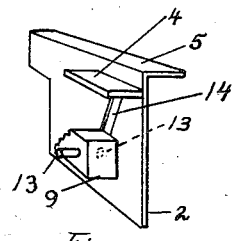
INVENTOR
Stanley E. Campbell
BY
*George B. Willey*
ATTORNEY Patented Feb. 18, 1936

2,031,407

UNITED STATES PATENT OFFICE 2,031,407

FASTENER

Stanley E. Campbell, Saginaw, Mich., assignor to Germain Manufacturing Company, Saginaw, Mich., a corporation of Michigan Application June 13, 1935, Serial No. 26,348

5 Claims. (Cl. 24—136)

This invention relates to improvements in the construction and operation of fasteners and, with regard to certain more specific features, to releasing fasteners with automatic clutching means for cords and the like.

The objects of the invention are, the provision of a fastener for cords such as are used on venetian blinds, window shades, awnings and the like adapted to permit free play of the control cord while it is being manipulated, but to automatically grip the cord when it is released; the provision of such a device which will grip a single cord, or two cords together; which is positive and dependable in its grip action on the cord; which will grip equally two parallel cords, although they may be of somewhat different diameters at the place where they are gripped, the gripping means being adapted to automatically adjust itself to such variable circumstances of use; the provision of a gripping device which will not unduly wear the cord after long continued use, which will grip the cord with only a very slight amount of lengthwise movement of the cord, and also will require no sidewise displacement of the freely hanging end of the cord in order to automatically produce the gripping action when the other end of the cord is pulled.

My invention comprises the structural features, the elements and combinations of elements and the arrangement of parts which will herein after be described as being embodied in a preferred form of the invention.

In the accompanying drawing there is illustrated one of various embodiments, and the scope of the application of the invention will be indicated in the appended claims.

Fig. 1 is a top plan view of a fastener embodying my improvement.

Fig. 2 is a side view, partly in section, one side of the housing being removed, the cord gripping device being in its inoperative position.

Fig. 3 is a similar view, showing the gripping device in action.

Fig. 4 is a front view with the cord removed.

Fig. 5 is a view in perspective.

Fig. 6 is a fragmentary view of the gripping jaw associated with the guide rod.

Fig. 7 is a fragmentary view showing a modified form of guide member for the jaw.

Like reference characters indicate corresponding parts throughout the several views of the drawing.

The fastener consists of a housing, preferably made of sheet metal, consisting of spaced side walls 1, 2, a bottom 3 and top member 4, and suitable flanges 5 for fastening the housing to a fixed support. In the upper part of the housing between the side walls 1, 2 is a curved cord guide, preferably in the form of a pulley 6, mounted on a pin 7 that connects the side walls 1, 2. Pulley 6 is preferably of suitable width to accommodate two cords side by side, although it may also be used with a single cord. The side walls of the housing are likewise spaced just far enough apart to permit the cords to operate properly on the pulley, and so serve as guides for the cords. An elongated guide member 8 is provided in the housing, spaced from and opposite the cord guide or pulley 6. It is preferably an elongated rod which is fixed in a substantially upright position midway of the width of the housing, between the side walls 1, 2. Guide member 8 is preferably positioned at a slight incline from the vertical, as shown in Figs. 2 and 3. Its upper end is farther away from the vertical plane, $y$—$y$ which includes the axis of pulley 6, than its lower end.

A gripping member or jaw 9 is freely slidable up and down lengthwise of the elongated guide member 8, being formed with a hole 9a that loosely receives the member 8. Normally the jaw 9 rests on the bottom 3 of the housing, as is shown in Fig. 2. The working face 10 of jaw 9 is opposed to pulley 6 and is roughened so as to present projections, such as ratchet-like teeth or serrations. The working face 10 is also sloped rearwardly from its bottom edge toward its top, and may be curved upwardly and rearwardly, that is, to the right in Figs. 2 and 3.

The serrations on the working face 10 may extend straight across it from side to side. The width of jaw 9 is appropriate to accommodate two cords placed side by side, and the jaw occupies nearly the full width between the side walls 1, 2 of the housing, as shown in Fig. 4, allowing the working face 10 to have a small amount of sidewise turning and also a tilting movement on the rod 8.

The operation of the fastener will be described as it is seen to function when controlling two parallel cords 11, 12.

It will be apparent from the foregoing detailed description that after the cords 11, 12 have been passed around the pulley 6 and downwardly past the working face 10 of the vertically slidable jaw 9, as shown in Fig. 2, a pull on the cords in the direction of the arrow will be halted by the gripping action between the jaw and the pulley when the jaw has been raised from the position shown in Fig. 2 to that of Fig. 3. When the jaw is in its lower position the cords can be run freely over the pulley in either direction provided they are not allowed to touch the serrations on face 10, but when either cord makes even a slight contact with the serrations or teeth on the working face 10 at some place near the bottom edge of the jaw 9 the jaw will be lifted by the cord, and will slide upwardly along the guide 8 until the working face squeezes the cord against the pulley 6. The relative arrangement of the guide pulley 6 and jaw 9 is such that when the cords hang down freely they normally engage the teeth of the jaw 9 slightly, but sufficiently to lift the jaw when the cords are pulled in the direction of the arrow and thereby cause the desired gripping action to occur entirely automatically. The looseness at 9a between the rod 8 and the hole through jaw 9 permits the working face 10 of the jaw to position itself so as to simultaneously clamp both cords although they may not be of the same diameter, perhaps one of them having been stretched or worn more than the other. This loose fit at 9a also facilitates lifting the jaw 9 to the position shown in Fig. 3, since the first contact of the cord against the lower part of the toothed edge of jaw 9 may cause the jaw to move backward slightly, that is, toward the right in Fig. 2. Such slight movement may help the lower teeth to make sufficiently good contact with the cord to lift the jaw 9 along the rod 8 until it comes to the clamping position shown in Fig. 3.

From the foregoing it is apparent that cords 11, 12 will lift the jaw 9 when they have only a very slight initial contact with the edge of the jaw. Consequently it is not necessary to move the cords from their natural depending position, that is to say, to the right in Fig. 3, in order to actuate the fastener. Merely dropping the free ends of the cords so they hang down naturally is all that is required to put the fastener in condition to lock. Moreover, to release the jaw 9 it is only necessary to move the depending end of the cord downward or sidewise a small distance, whereas earlier devices of similar character usually required a considerable amount of preliminary sidewise movement of the cord for releasing it.

The top member 4 is preferably located slightly below the flange 5, as shown, in order to enable it to serve as a stop to halt the upward movement of jaw 9 when the working face 10 is exerting its greatest gripping force opposite the pulley or guide member 6, and to prevent the jaw from being carried beyond that desirable position.

In the foregoing description the guide member 8 has been referred to as a rod. An alternative embodiment of this feature is illustrated in Fig. 7, wherein the jaw 9 is provided with two pins 13, projecting from its side faces. The pins are slidingly received in elongated slots, grooves or equivalent ways 14 provided in the side walls 1, 2, of the housing and constituting elongated guide members. The ways 14 are preferably wider than the pins, to permit the jaw to turn slightly about its vertical axis and thus enable the working face 10 to position itself for properly gripping two cords of slightly different sizes, as has been explained in the discussion of rod 8. The alternative form, Fig. 7, is presented as being merely typical of various other arrangements of guides that may be employed without further invention and without departing from the broader aspects of the improvement, as set forth in certain of the appended claims.

Having thus described my invention, what I claim and desire to secure by Letters Patent is:

1. A housing including spaced side walls and a curved cord guide between said walls, having in combination an elongated guide member spaced from and opposite said cord guide and positioned substantially upright, a jaw member slidably mounted for free movement lengthwise upon said elongated guide member and also capable of slight turning movements in relation thereto, said jaw member having a serrated working face.

2. A structure as set forth in claim 1 wherein the serrated working face of said jaw member is sloped from the lower edge of the jaw member upwardly and rearwardly.

3. A structure as set forth in claim 1 wherein the said jaw member is provided with oppositely directed laterally projecting pins slidingly received in ways provided in the side walls of said housing.

4. A structure as set forth in claim 1 wherein the said jaw member is formed with a hole loosely receiving said elongated guide member and is capable of limited sidewise and tilting movements thereon.

5. A structure as set forth in claim 1 wherein the said elongated guide member is positioned at a slight incline from the vertical, its upper end being further away from the vertical plane of the cord guide than its lower end.

STANLEY E. CAMPBELL.